United States Patent [19]

Jones

[11] Patent Number: 4,784,629
[45] Date of Patent: Nov. 15, 1988

[54] BEARING RETAINER STRAP

[75] Inventor: Terry D. Jones, Perrysburg, Ohio

[73] Assignee: Dana Corporation, Toledo, Ohio

[21] Appl. No.: 83,078

[22] Filed: Aug. 10, 1987

[51] Int. Cl.⁴ ............................................. F16D 3/40
[52] U.S. Cl. ................................................... 464/130
[58] Field of Search ............... 464/128, 129, 130, 132, 464/136

[56] References Cited

U.S. PATENT DOCUMENTS

| | | | |
|---|---|---|---|
| 2,124,803 | 7/1938 | Wollner | 464/130 |
| 2,132,816 | 10/1938 | Wollner | 464/130 |
| 2,212,763 | 8/1940 | Wollner | 464/130 |
| 2,228,715 | 1/1941 | Wollner | 464/130 |
| 2,648,207 | 8/1953 | Quinn | 464/136 |
| 2,698,527 | 1/1955 | Anderson | 464/130 |
| 2,770,114 | 11/1956 | Slaght | 464/130 |
| 3,783,638 | 1/1974 | Doran et al. | 464/130 |

FOREIGN PATENT DOCUMENTS 2060136 4/1981 United Kingdom ............... 464/130

*Primary Examiner*—Daniel P. Stodola
*Attorney, Agent, or Firm*—Marshall & Melhorn

[57] ABSTRACT

A device for retaining a pair of bearing cups on opposing trunnions on a universal joint cross includes a pair of snap rings and a bearing retainer strap. The snap rings each have an outwardly extending portion formed therein and the bearing strap has groove engaging portions formed at opposite ends thereof by folding over the ends of the strap. The groove engaging portions extend into annular grooves formed in the outer surfaces of the bearing cups. The retaining rings are then inserted into the grooves and the outwardly extending portions engage the ends of the strap to maintain the groove engaging portions in the grooves. The strap is formed with a predetermined length corresponding to a desired spacing between the bearing cups.

6 Claims, 1 Drawing Sheet

U.S. Patent  Nov. 15, 1988  4,784,629
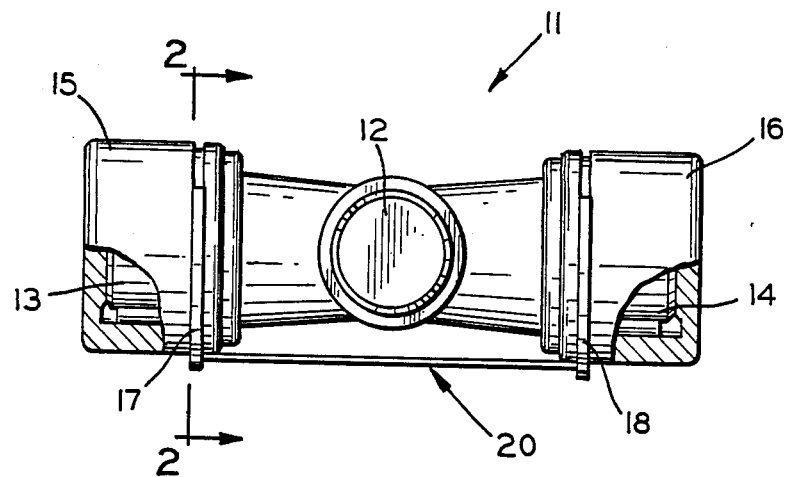
FIG. 1
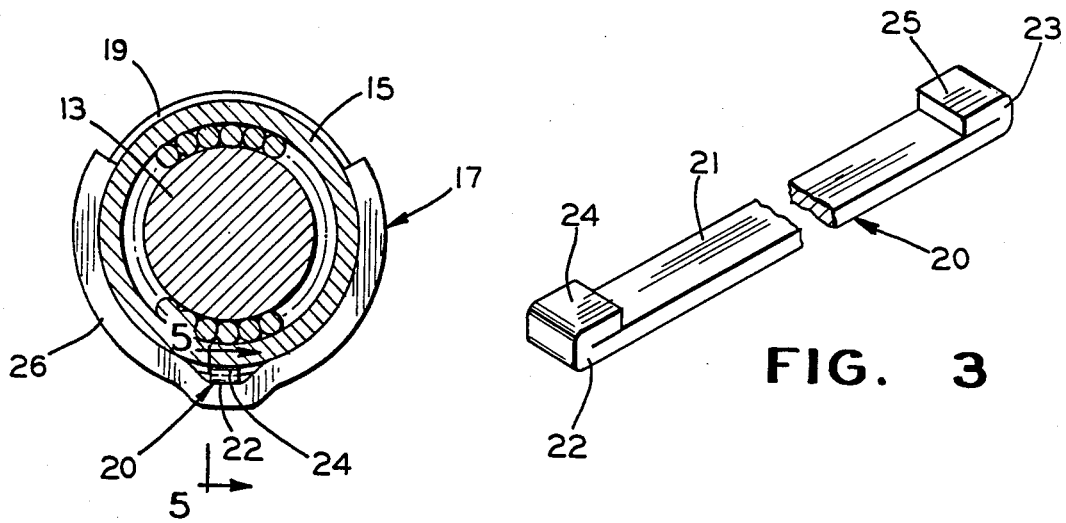
FIG. 2
FIG. 3
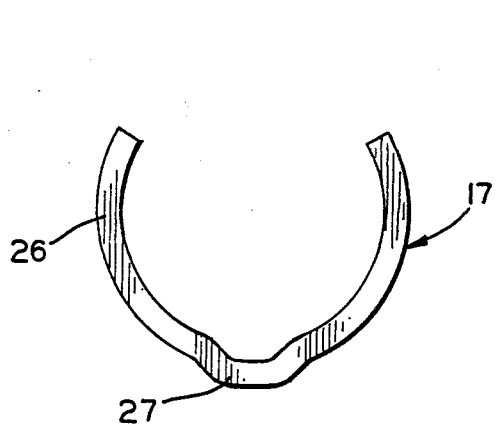
FIG. 4
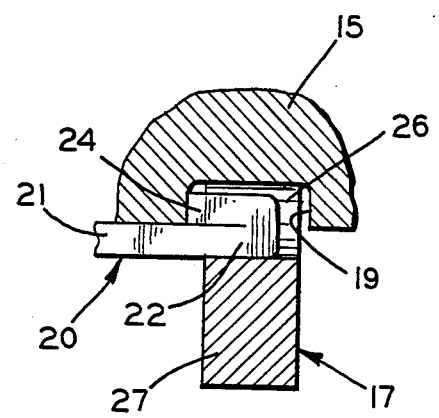
FIG. 5

BEARING RETAINER STRAP

BACKGROUND OF THE INVENTION

This invention relates generally to universal joints and, in particular, to a device for retaining bearing cups on a universal joint kit.

Many devices have been utilized to hold the bearing cups on the trunnions of a universal joint during assembly and shipping. Typically, a universal joint mechanism includes a central connecting member, frequently called a "cross", formed with trunnions to which the separate sections of shaft are respectively rotatably mounted. The trunnions are provided with completely enclosed bearings so that lubricant is applied only at the time of initial assembly. To reduce the number of parts involved in a complete joint assembly, it has been found desirable, particularly in the automobile industry, to assemble one or both of the shaft sections with the co-operating trunnions on the automobile assembly line, rather than to initially assemble a complete joint and thereafter attach the shafts.

The trunnions of a universal joint typically include a set of roller bearings which are covered by bearing cups or caps each having an annular recess formed in an outer surface thereof. A retaining ring, such as a snap ring, engages the recess in each cup. Yokes formed on the ends of the shafts include conventional journals which are pressed upon the associated bearing cups and engage the retaining rings. In one prior art device, the central portion of each of the retaining rings is bowed outwardly and passes through a circular end section of a connecting link positioned to maintain the bearing cups on the trunnions.

In another prior art device, retaining rings with outwardly extending central portions are also used. However, a spring-like tie element has opposite ends extending through a gap between the annular groove and the outwardly extending central portion of the retaining ring. Each end of the tie then extends radially outwardly along an adjacent surface of the retaining ring central portion and is attached thereto.

In yet another prior art device, a spring element is provided with an intermediate coil portion and hook shaped ends which engage the outwardly extending central portions of the snap rings. The spring resiliently holds the bearing cups on the trunnions.

In another prior art device, a strap is welded to the body of the cross and the ends of the strap are formed as tongues which extend into the grooves for the retaining rings. Also found in the prior art is a device in which two retaining rings are secured to one another by a substantially, non-resilient strap bridge formed integral with the rings.

SUMMARY OF THE INVENTION

The present invention is concerned with a device for retaining a pair of bearing cups on the opposed trunnions of a universal joint cross. A pair of retaining rings engage annular grooves formed in the outer surface of the bearing cups. Each of the retaining rings has a central body portion which extends outwardly to form an opening between the retaining ring and the bearing cup. A retaining strap has opposite end portions folded back upon the body of the strap which folded end portions extend into the bearing cup grooves and are held therein by the central portions of the retaining rings. Thus, the strap holds the bearing cups on the trunnions and also precisely spaces the bearing cups a predetermined distance apart.

BRIEF DESCRIPTION OF THE DRAWINGS

FIG. 1 is a side elevational view of a universal joint cross showing the retaining device of the present invention installed thereon;

FIG. 2 is an enlarged cross-sectional view taken along the line 2—2 in FIG. 1;

FIG. 3 is an enlarged fragmentary perspective view of the retaining strap according to the present invention shown in FIG. 1;

FIG. 4 is a plan view of a retaining ring in accordance with the present invention as shown in FIG. 1; and FIG. 5 is an enlarged fragmentary cross-sectional view taken along the line 5—5 in FIG. 2.

DESCRIPTION OF THE PREFERRED EMBODIMENT

There is shown in FIG. 1 a universal joint cross 11 having trunnions 12, 13 and 14. The trunnion 12 and an opposed trunnion (not shown) are adapted to be connected to the yoke of a first shaft such as a drive shaft (not shown) in a vehicle. The opposed trunnions 13 and 14 are adapted to be connected to the yoke of a second shaft such as a driven shaft (not shown) in a vehicle. The trunnions 13 and 14 are covered by bearing cups 15 and 16 respectively. The bearing cups retain the rollers of a roller bearing and the associated lubricant. Each of the bearing cups 15 and 16 is engaged by a snap ring 17 and 18 respectively. As best shown in FIG. 2, the bearing cup 15 has an annular groove 19 formed in an outer surface thereof. The snap ring 17 is retained in the groove 19 and is adapted to abut a surface on a yoke of a shaft (not shown).

During assembly, shipping and storage, the bearing cups 15 and 16 must be retained on the trunnions 13 and 14 respectively until the cross 11 is assembled to the yoke of a shaft. A bearing retainer strap 20 is provided in accordance with the present invention to maintain the bearing cups on the trunnions and to maintain the bearing cups in a predetermined spaced relationship. As best shown in FIG. 3, the strap 20 has an elongated body 21 which terminates in opposite ends 22 and 23. The body 21 is shown as being rectangular in cross-section, but could be of any suitable shape. The end 22 is folded over upon the body 21 to provide a groove engaging portion 24. Similarly, the end 23 is folded over to provide a groove engaging portion 25.

As shown in FIG. 4, the snap ring 17 is formed with a semi-circular groove engaging body 26 having an outwardly extending central portion 27. The central portion 27 is formed to provide a means for retaining the end 22 and the groove engaging portion 24 of the bearing retainer strap 20. As shown in FIG. 5, the central portion 27 of the snap ring 17 abuts the end 22 of the strap 20 and retains the groove engaging portion 24 in the groove 19 while the body portion 26 of the snap ring 17 engages the remainder of the annular groove 19 of the bearing cup 15. The snap ring 18 is formed in a similar manner to abut the end 23 and retain the groove engaging portion 25 of the bearing retainer strap 20 in the groove formed in the bearing cup 16. The snap rings 17 and 18, and the bearing retainer strap 20 can be formed of any suitable material such as steel.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for retaining a pair of bearing cups on opposed trunnions of a universal joint cross, each of the bearing cups having an annular groove formed in an outer surface thereof, comprising:

a pair of snap rings each having a semi-circular body portion with an outwardly extending portion formed therein; and a bearing retainer strap having an elongated body of a predetermined length with a groove engaging portion formed at each end thereof, each said end being folded over upon said body to form said groove engaging portions adapted to extend into and engage the annular groove formed in an outer surface of a bearing cup and said outwardly extending portion of said snap rings adapted to abut opposite ends of said bearing retainer strap and maintain said groove engaging portions of said bearing retainer strap in the grooves formed in the bearing cups.

2. The apparatus according to claim 1 wherein said outwardly extending portion is formed in a central portion of each of said snap rings.

3. The apparatus according to claim 1 wherein said bearing retainer strap is formed with a rectangular cross-section.

4. An apparatus for retaining a pair of bearing cups on opposed trunnions of a universal joint cross, comprising:

a pair of snap rings each formed with a semi-circular body having an outwardly extending central portion; and a bearing retainer strap of generally rectangular cross-section including an elongated body of a predetermined length terminating in opposed ends, each said end folded over upon said body to form a groove engaging portion adapted to extend into and engage an annular groove formed in an outer surface of a bearing cup and maintain a pair of bearing cups in spaced relationship on opposed trunnions of a universal joint cross when said snap rings engage the annular grooves with said central portions abutting said opposite ends of said bearing retainer strap.

5. A universal joint assembly comprising:

a universal joint cross having at least two opposed trunnions;

a pair of bearing cups each engaging one of said trunnions and having an annular groove formed in an outer surface thereof;

a bearing retainer strap having an elongated body of a predetermined length with opposed ends, each said end being folded over upon said elongated body to form a groove engaging portion extending into and engaging an associated one of said grooves; and a pair of snap rings each having a semi-circular body with an outwardly extending central portion, said snap rings engaging said annular grooves with said central portions abutting an associated one of said opposed ends to maintain said groove engaging portions in said grooves and said bearing cups in a spaced relationship.

6. The assembly according to claim 5 wherein said bearing retainer strap is generally rectangular in cross-section.

* * * * *